(12) United States Patent
Kiefer et al.

(10) Patent No.: US 7,458,270 B2
(45) Date of Patent: Dec. 2, 2008

(54) INFLATION AND PRESSURE GAUGE APPARATUS

(76) Inventors: Glenn Kiefer, 10332 S. 535 East, Sandy, UT (US) 84070; Emilio Funes, 12486 S. 700 East, Draper, UT (US) 84020

( * ) Notice: Subject to any disclaimer, the term of this patent is extended or adjusted under 35 U.S.C. 154(b) by 3 days.

(21) Appl. No.: 11/810,192

(22) Filed: Jun. 4, 2007

(65) Prior Publication Data

US 2007/0295075 A1      Dec. 27, 2007

Related U.S. Application Data

(60) Provisional application No. 60/810,286, filed on Jun. 2, 2006.

(51) Int. Cl.
 *G01M 17/02* (2006.01)
(52) U.S. Cl. .......................... 73/718; 73/146
(58) Field of Classification Search ........ 73/146–146.8, 73/718; 340/442–447
See application file for complete search history.

(56) References Cited

U.S. PATENT DOCUMENTS

| | | |
|---|---|---|
| 1,573,793 A | 2/1926 | Anderson |
| 2,501,801 A | 3/1950 | Wallin |
| 3,719,198 A | 3/1973 | Wilhelm et al. |
| 3,720,224 A | 3/1973 | Foxhall |
| 3,824,849 A | 7/1974 | Foxhall |
| 3,969,936 A | 7/1976 | Lindsay |
| 4,116,245 A | 9/1978 | Ayers |
| 4,136,560 A | 1/1979 | Gellos |
| 4,333,491 A | 6/1982 | Knubley |
| 4,763,516 A | 8/1988 | Greenspan |
| 4,793,177 A | 12/1988 | Wu et al. |
| 4,998,438 A | 3/1991 | Martin |
| 5,100,206 A | 3/1992 | Feng |
| 5,158,122 A | 10/1992 | Moffett |
| 5,419,377 A | 5/1995 | Harris |
| 5,604,482 A | 2/1997 | Majeet et al. |
| 5,665,908 A | 9/1997 | Burkey et al. |
| 5,770,797 A | 6/1998 | Lapohn |
| 5,771,834 A | 6/1998 | Hsiao |
| 6,025,777 A | 2/2000 | Fuller et al. |
| 6,279,599 B1 | 8/2001 | Chen |
| 6,463,798 B2 | 10/2002 | Niekerk et al. |
| 6,486,771 B1 | 11/2002 | Fuller et al. |
| 6,571,617 B2 | 6/2003 | Van Niekerk et al. |
| 6,606,903 B2 | 8/2003 | Hsu |
| 6,843,115 B2 | 1/2005 | Rutherford |
| 6,911,903 B2 | 6/2005 | Gladstone et al. |
| 6,978,670 B2 | 12/2005 | Cousineau |
| 7,040,152 B2 | 5/2006 | Rutherford |
| 7,197,919 B2 * | 4/2007 | Wu .............................. 73/146 |

(Continued)

FOREIGN PATENT DOCUMENTS

GB      369069      3/1932

*Primary Examiner*—Andre J. Allen
*Assistant Examiner*—Jermaine Jenkins
(74) *Attorney, Agent, or Firm*—Clayton Howarth & Cannon, P.C.

(57) ABSTRACT

A device for introducing air or other pressurized gas into a tire, sports ball or other pneumatic device. The device advantageously allows the user to check the pressure of the gas and to release excess the gas from the tire or other pneumatic device without removing the apparatus from the tire or other pneumatic device.

20 Claims, 3 Drawing Sheets

U.S. PATENT DOCUMENTS

| | | |
|---|---|---|
| 7,281,420 B2 * | 10/2007 | Wrubel ..................... 73/146.3 |
| 2001/0023613 A1 | 9/2001 | Lemberger et al. |
| 2002/0005066 A1 | 1/2002 | Tanner et al. |
| 2002/0092345 A1 | 7/2002 | Van Niekerk et al. |
| 2002/0092346 A1 | 7/2002 | Niekerk et al. |
| 2002/0092347 A1 | 7/2002 | Niekerk et al. |
| 2002/0108434 A1 | 8/2002 | Ziarati |
| 2002/0166371 A1 | 11/2002 | Ratti et al. |
| 2003/0005758 A1 | 1/2003 | Dotson |
| 2003/0226400 A1 | 12/2003 | Rutherford |
| 2004/0021562 A1 | 2/2004 | Prenninger |
| 2004/0088135 A1 | 5/2004 | Fujioka |
| 2004/0154403 A1 | 8/2004 | Petrucelli |
| 2004/0169417 A1 | 9/2004 | Dombrowski |
| 2004/0178897 A1 | 9/2004 | Fennel et al. |
| 2004/0258534 A1 | 12/2004 | Patel |
| 2005/0056358 A1 | 3/2005 | Eriksen et al. |
| 2005/0072348 A1 | 4/2005 | Johns |
| 2005/0138999 A1 | 6/2005 | Petrucelli |
| 2005/0217363 A1 | 10/2005 | Cousineau |
| 2007/0209432 A1 * | 9/2007 | Rutherford ................. 73/146.8 |

* cited by examiner

INFLATION AND PRESSURE GAUGE APPARATUS

RELATED APPLICATION

This application claims the benefit of U.S. Provisional Application No. 60/810,286 filed Jun. 2, 2006, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. Field of the Invention

This disclosure relates generally to an apparatus for inflating and deflating pneumatic devices. More particularly, this apparatus can be used to inflate and/or adjust and/or measure the gas pressure in pneumatic devices.

2. Background Art

Air inflation apparatuses are well known in the art. Hand pumps for inflating bicycle tires and other objects such as balls used for sports as well as air compressors for inflating automobile tires have existed for many years. Gauges for measuring the air pressure in a tire are also well known. Traditionally, however, the inflation and pressure checking functions are not reliably combined in one apparatus. Therefore, when inflating a tire, or introducing gas into any other pneumatic device, it is generally necessary to attach the chuck, or the threaded end of the inflation apparatus to the valve of the device being inflated, introduce the pressurized air or other gas into the device, and then remove the chuck or the threaded end of the inflation device from the valve of the device being inflated in order to apply a separate pressure gauge to measure the air pressure. Although some inflation apparatuses do have a pressure gauge incorporated as an integral part of the apparatus, either the apparatus must be removed or the pressurized air source must be removed from the apparatus in the event the pneumatic device is overinflated, in order to apply a device to the valve stem to release the excess gas. This makes obtaining an accurate filling of the pneumatic device cumbersome and difficult to achieve.

In view of the disadvantages found in the art, it would be desirable to provide an apparatus that enabled the user to introduce pressurized air or other fluid into the pneumatic device, to check the pressure and to release excess air or fluid from the pneumatic device, all without having to detach the apparatus from the tire or other pneumatic device.

In addition, it would be desirable to be able to introduce pressurized air or other gas into the pneumatic device, to check the pressure and to release excess air or other fluid from the pneumatic device, all these functions being provided without having to detach the apparatus from its supply of compressed air or other fluid.

Still further, it would be desirable to have an apparatus that allowed the attachment of various types of connectors so that the apparatus can be used to introduce pressurized air or other fluid into a tire or other fluidic device, but also to operate a paint sprayer or other tools that operate on compressed air.

Even further, illustrative embodiments disclosed herein teach an effective apparatus for introducing pressurized gas into a sports ball, automobile tire or bicycle tire that allows the user to introduce the pressurized gas into the device, check the pressure and release excess gas from the device without having to remove the apparatus from the valve of the device. In addition, this apparatus can be used on any device that holds compressed air or other gas, such as a portable air tank, a propane tank for a barbeque grill, or an inflatable mattress or similar devices.

SUMMARY OF THE DISCLOSURE

It is a function of the present disclosure to provide an apparatus for introducing air or other pressurized fluid into a tire or other device.

It is a further function of the present disclosure to allow the user to check the pressure of the air or other fluid without removing the apparatus from the tire, ball or other device.

It is a further function of the present disclosure to allow the user to release excess air or other gas from the tire, ball or other device without removing the apparatus from the tire, ball or other device.

BRIEF DESCRIPTION OF THE DRAWINGS

The nature and mode of operation of the present disclosure will be more fully described in the following detailed description of the illustrative embodiments of the invention taken with the accompanying drawing figures, in which.

DETAILED DESCRIPTION

At the outset, it should be appreciated that like drawing numbers on different views identify similar structure elements of the illustrative embodiments. While the presently illustrative embodiments are described with respect to what is presently considered to be preferred, it is understood that the invention is not limited to the disclosed illustrative embodiments.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention pertains. Although any methods, devices or materials similar or equivalent to those described herein can be used in the practice or testing of the invention, the preferred methods, devices, and materials are now described.

Figure 1:
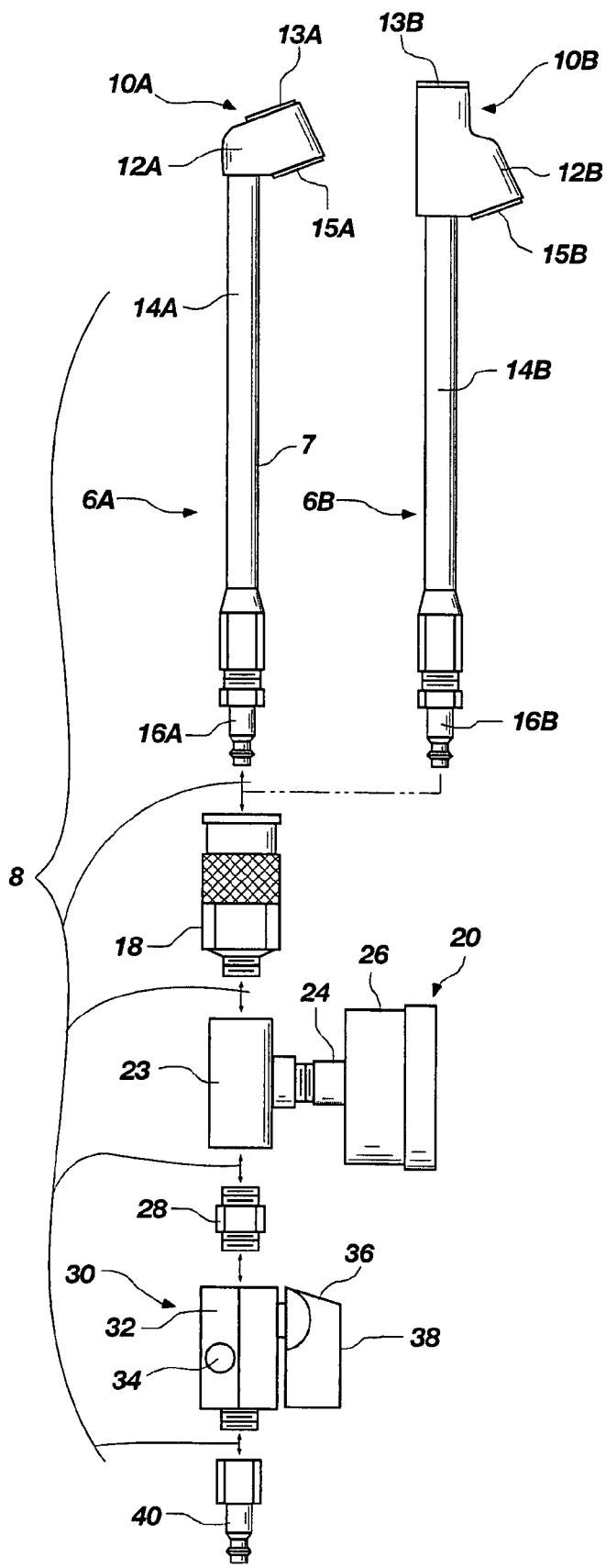
FIG. 1 is an exploded side view of an illustrative embodiment of the apparatus.
Figure 2:
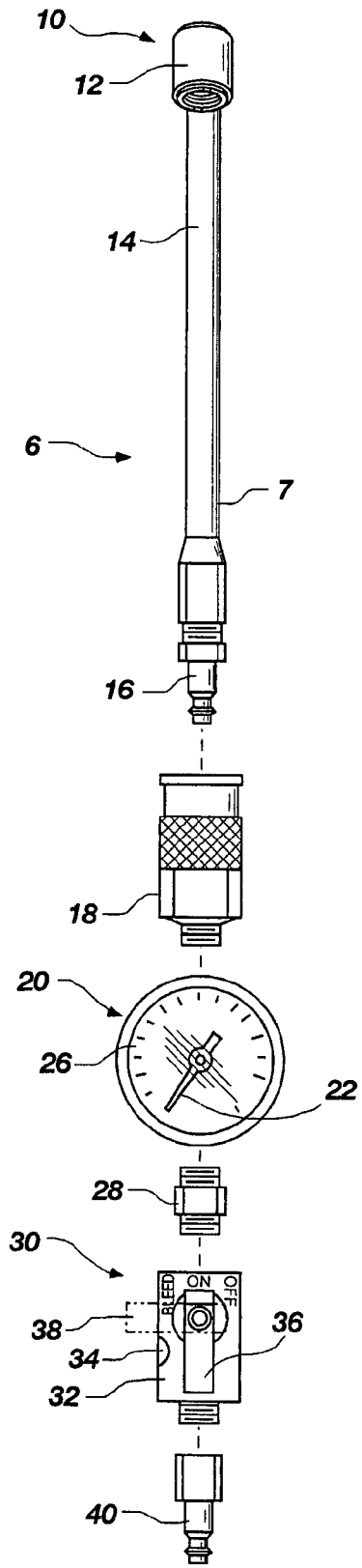
FIG. 2 is an exploded top view of the illustrative embodiment of the apparatus represented in FIG. 1.

FIG. 1 depicts an exploded side view and FIG. 2 depicts an exploded top view of the apparatus wherein the apparatus, generally indicated at 6, comprises an enclosed passage, generally indicated at 8, of sufficient size and shape such as to contain a gas or fluid under pressure within its interior and confines and conducts said gas under pressure from a pressurizing source such as an air compressor (not explicitly shown in the figures) to a pneumatic device (also not explicitly shown in the figures) such as a pneumatic device. The pneumatic device can be a car or truck tire, a bicycle tire, an inflatable mattress, a portable tank for transporting a gas under pressure, such as a portable tank for filling automobile tires, or a tank containing fuel for an outdoor barbeque grill or any number of presently know, or available in the future, devices. In addition, this apparatus 6 can be attached to a paint sprayer or other tool or device that operates on pressurized air. A tube structure 7 defines the enclosed passage 8. The tube structure 7 can be comprised of plastic, steel, brass, aluminum, rubber, an alloy, or any other material known to those skilled in the art that is rigid, semi rigid or even flexible and therefore suitable for being formed in a shape sufficient to define a passage suitable to direct a gas under pressure.

Continuing to refer to FIGS. 1 and 2, the apparatus 6 possesses a connector 40 that serves as a means for attaching the apparatus 6 to a pressurizing source such as an air compressor, a pump, or other similar device (not explicitly shown). As shown in the illustrative embodiment, the connector 40 is a nipple type connector that can be connected to the pressurizing source by means of a "quick-connect" sliding collar type coupler. However, the connector 40 can also be a threaded screw as well as a sliding collar type coupler, or any other type of suitable coupling, depending on whether the compressor possesses a threaded screw end or a sliding collar type coupler. In addition, the connector 40 can also be any type of coupler which can be selected by those skilled in the art.

It will be appreciated that the particular structure and apparatus disclosed herein is merely exemplary of a means for attaching the said apparatus 6 to the pressurizing source and it should be appreciated that any structure, apparatus or system for attaching the said apparatus 6 to the pressurizing source which performs functions the same as, or equivalent to, those disclosed herein are intended to fall within the scope of a means for attaching the said apparatus 6 to the pressurizing source, including those structures, apparatus or systems which are presently known, or which may become available in the future. Any structure which functions the same as, or equivalently to, a means for attaching the said apparatus 6 to the pressurizing source falls within the scope of this inventive element.

Attached at some point along the enclosed passage 8 is a gauge, generally indicated at 20, for measuring pressure of the gas in the pneumatic device. As shown here, the gauge 20 is of a mechanical type with an analog type rotating dial 22. However, the gauge 20 can also be, digital, electrical or any other type known to those skilled in the art. As shown, the gauge 20 is attached to the enclosed passage 8 by means of a "T" joint 24 that is located within the length 23 of the tube structure 7. When the gauge is threaded onto the "T" joint 24, the gauge 20 is in communication with the interior of the enclosed passage 8 such that the gauge 20 can measure the pressure of the gas present in the interior of the enclosed passage 8. The gauge 20 can also be welded or soldered onto the "T" joint 24 or joined to "T" joint 24 by any other means known to those skilled in the art. The gauge 20 can also be molded as an integral part of the apparatus 6. However, constructing the apparatus 6 in such a way that the gauge 20 is removably attached at a point along the enclosed passage 8 allows the gauge 20 to be replaced in the event the gauge 20 malfunctions, or for any other reason.

It will be appreciated that the particular structure and apparatus disclosed herein is merely exemplary of a means for measuring the gas pressure contained in a pneumatic device, and it should be appreciated that any structure, apparatus or system for measuring the gas pressure contained in a pneumatic device which performs functions the same as, or equivalent to, those disclosed herein are intended to fall within the scope of a means for measuring the gas pressure contained in a pneumatic device, including those structures, apparatus or systems which are presently known, or which may become available in the future. Any structure which functions the same as, or equivalently to, a means for measuring the gas pressure contained in a pneumatic device falls within the scope of this inventive element.

Still referring to FIGS. 1 and 2, the apparatus 6 also possesses a head assembly 10 that serves as a means for removably attaching the apparatus 6 to a valve stem or other inlet for accepting gas into the pneumatic device. The head assembly 10 as shown here, comprises a head 12 sized and shaped to fit over the valve stem (not shown) of an automobile, bicycle or other vehicular tire. The head 12 has at least one pin (not explicitly represented) that engages the valve of the valve stem and depresses it from a position of blocking introduction of gas into the tire such that when the apparatus 6 is attached to the valve stem and also is attached to the pressurizing source the apparatus 6 can effect the delivery of the pressurized gas into the pneumatic device. In the embodiment depicted by FIGS. 1 & 2, the head 12 has a first opening 13 having a first pin (not shown) and a second end 15 having a second pin (not shown). The head 12 can also be of a threaded type that screws onto the valve stem of the tire or the valve of the other pneumatic device. In the alternative, the head 12 can be a "quick-connect" sliding collar type coupler.

As shown here, the head assembly 10 also comprises a shaft 14 extending from the head 12. This shaft 14 can be of any length. For example, an apparatus 6 for inflating large truck tires would be most useful with a shaft 14 long enough that the apparatus can reach easily from the outer perimeter of the tire to the valve stem located on or near the wheel rim so that the valve stem can be readily reached when the valve stem is located between dual tires.

The embodiment depicted in FIG. 1, shows two alternative head assemblies which are depicted as 10A and 10B. In the head assembly depicted in 10A, the head 12A is angled with respect to the shaft 14A. This allows easy access to the valve stem under certain circumstances depending on the configuration of the pneumatic device. The second end 15A also allows the apparatus 6 to reach valve stems that may be inaccessible to the first end 13A. In the head assembly depicted in 6B, the first end, 13B is not angled with respect to the shaft while the second end 15B is angled with respect to the shaft. The lack of angle of the first end 13B with respect to the shaft allows the apparatus 6B to reach valve stems that might be inaccessible to the head assembly depicted in 10A.

The shaft 14 of the head assembly 10 also possesses a nipple connector 16 suitable for connecting to a "quick-connect" sliding collar type coupler 18 for removably attaching the head assembly 10 to the apparatus 6. This allows the head assembly 10 to be readily detachable and replaced by other head assemblies of various sizes, shapes and functions. This feature allows the apparatus 6 to be utilized to inflate not just tires, but also air mattresses, propane tanks for portable barbeque grills, sports balls, paint sprayers or other tools or devices that require pressurized fluid. This feature also allows the head assembly 10 to be rotatable with respect to the rest of the apparatus 6. This feature also allows the apparatus 6 to be rotated when the head assembly 10 is attached to the valve stem of the tire or other pneumatic device being inflated or deflated. This feature also allows the gauge 20 to be read regardless of the position of the valve stem. However, the head assembly 10 can also be threaded onto the apparatus 6 or can be permanently affixed to the apparatus 6 by soldering, brazing, welding or any other method readily known to those skilled in the art.

It will be appreciated that the particular structure and apparatus disclosed herein is merely exemplary of a means for removably attaching the apparatus to the pneumatic device, and it should be appreciated that any structure, apparatus or system for removably attaching the apparatus to the pneumatic device which performs functions the same as, or equivalent to, those disclosed herein are intended to fall within the scope of a means for removably attaching the apparatus to a pneumatic device, including those structures, apparatus or systems for providing an answer which are presently known, or which may become available in the future. Any structure which functions the same as, or equivalently to, a means for removably attaching the apparatus to the pneumatic device falls within the scope of this inventive element.

A valve assembly, generally indicated at 30, is positioned at some point along the enclosed passage 8. The valve assembly 30 can be manipulated to interrupt the flow of pressurized gas through the enclosed passage 8. The valve assembly comprises a valve body 32 possessing a gate (not explicitly shown) or other means for interrupting or channeling the flow of gas through the enclosed passage 8. The gate (not explicitly shown) or other means for interrupting or channeling the flow of gas through the enclosed passage 8 is controlled by a handle 36. The handle 36, has three positions, a first position or OFF a second position or ON and a third position or BLEED (represented at 38). When the handle 36 is rotated to the first position, the gate is located so as to interrupt the flow of gas through the enclosed passage 8. When the handle 36 is rotated to the second position, the gate (not shown) is located so as to allow gas to flow from the source of compressed gas to the pneumatic device. When the handle 36 is located in the third position, the gate is located so as to interrupt the flow of gas from the source of compressed gas, but directs gas from the pneumatic device to an exit through a bleed port 34.

The valve assembly 30 is arranged such that when said valve handle 36 is manipulated to the first position, the flow of gas through the enclosed passage 8 is interrupted and the pressure of the gas within the tire or other pneumatic device can be measured by the gauge 20.

In an alternative illustrative embodiment, the valve assembly 30 may not have a bleed port. The valve handle 36 has only a first position and a second position. In such an alternative embodiment, gas is released from the pneumatic device by disconnecting the apparatus 6 from the source of compressed gas at the nipple connector 40, and turning the valve handle 36 to the second position. This allows the gas to flow from the pneumatic device and exit at the nipple connector 40.

Figure 3:
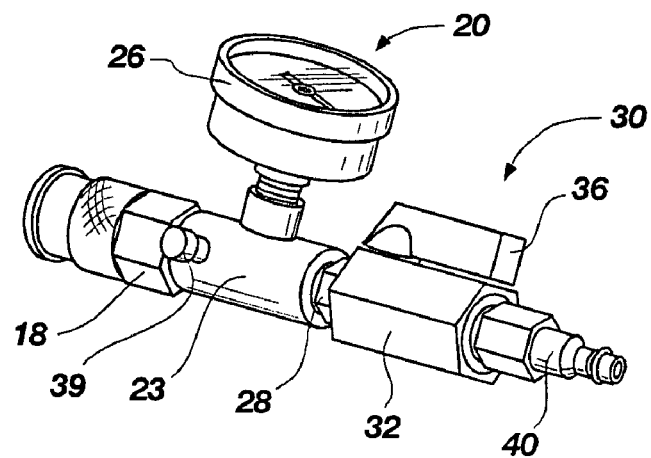
FIG. 3 is a perspective view of the connector, valve, gauge and quick connect coupler.

An alternative illustrative embodiment of the valve assembly 30, and gauge 20 is depicted generally in FIG. 3. In this illustrative embodiment, the valve assembly 30 does not have a bleed port. The valve handle 36 has a first position and a second position. In this embodiment, the length of the tube structure 23 attached to the gauge 20 includes a button 39, in communication with the enclosed passage 8 through an opening in the tube structure 23. The button 39 is biased with a spring (not explicitly shown) or other biasing mechanism such that in its neutral position, a surface of the button 39 presses against a surface of the tube structure so as to create an airtight seal in the opening in the tube structure 23. When the valve 36 handle is in the first position, interrupting the flow of gas from the compressed air source, gas can be released from the pneumatic device by pressing the button so as to break the seal between the surface of the button 39 and the surface of the tube structure 23.

Figure 4:
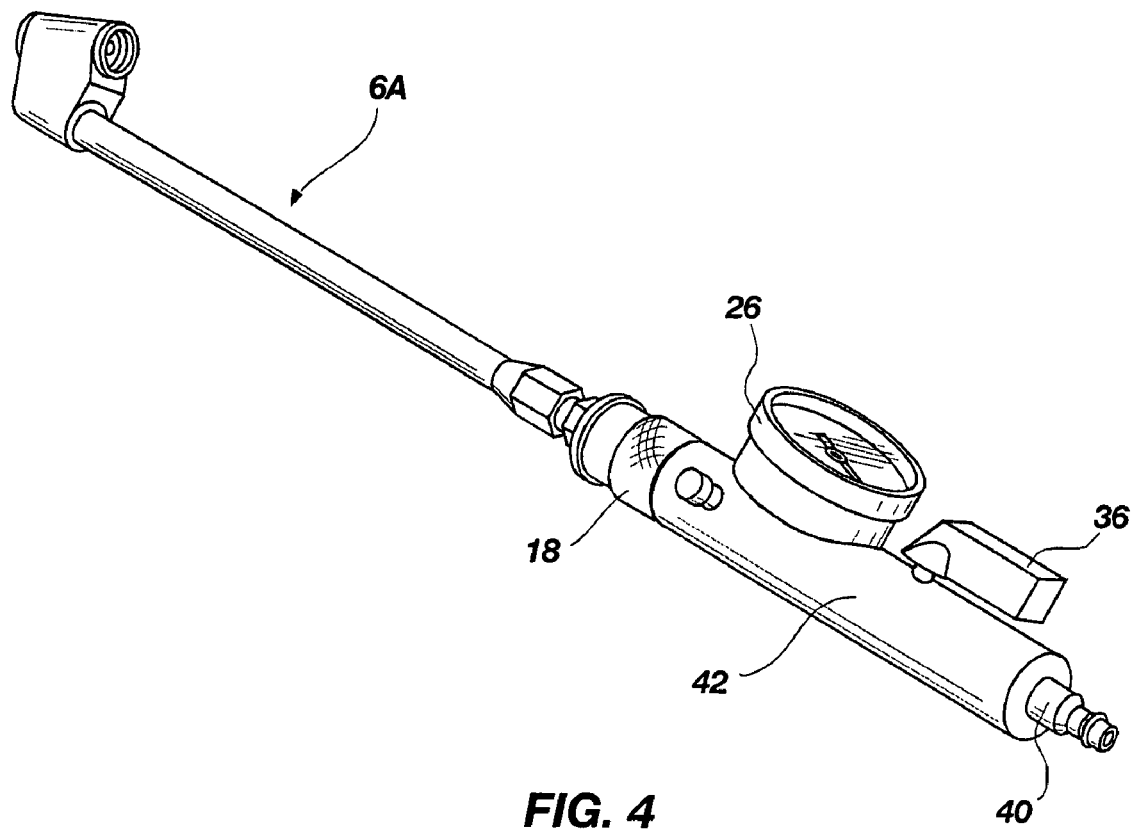
FIG. 4 is a perspective view of another illustrative embodiment of the apparatus having a one-piece unitary body.

FIG. 4 depicts a perspective view of another embodiment of the invention. This embodiment comprises a one-piece body 42 that contains a sliding type coupler 18 connected to the head assembly 10, a valve handle 36 that controls the valve gate (not shown), a gauge 20, a connector 40 and a push button 39 to release air from the pneumatic device.

Figure 5:
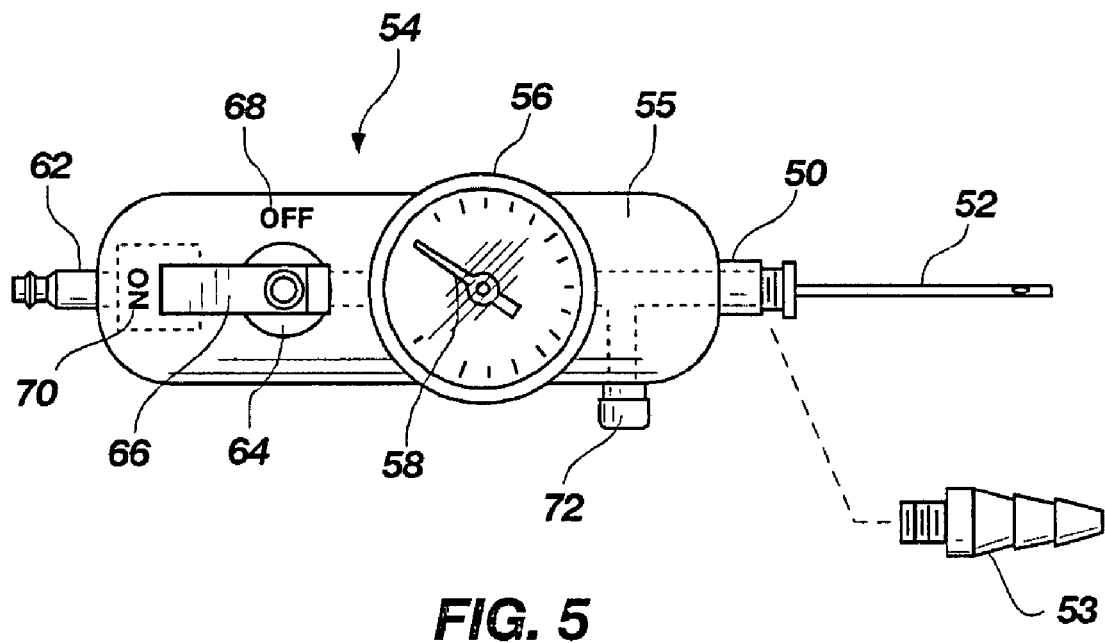
FIG. 5 is a top view of another illustrative embodiment of the apparatus adapted for inflation of sports balls and similar devices.
Figure 6:
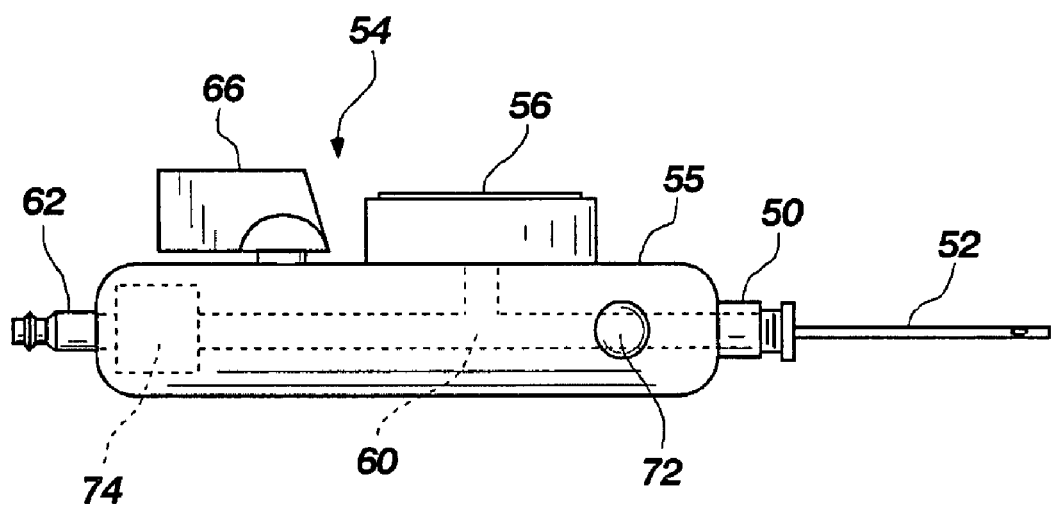
FIG. 6 is a side view of the illustrative apparatus represented in FIG. 4.

Another illustrative embodiment of the invention is depicted in FIG. 5 and FIG. 6. The illustrative embodiment of FIGS. 5 and 6 is particularly adapted for inflation of balls used in sports, such as footballs (American), basketball, soccer (American), volleyballs and other sporting games. In this embodiment, the apparatus, generally indicated at 54, possesses a body 55 comprising a single molded piece. A head assembly 50 can receive a needle assembly 52, or can be replaced with a needle assembly (such as a widely available 4 centimeters inflation needle), customarily used to provide an inflation passageway into the interior of sports balls through the valve assembly generally provided in such sports balls.

Referring particularly to FIG. 5, in the place of a needle assembly 52 a nozzle with a graduated external diameter 53 can be substituted. The nozzle with a graduated external diameter 53 can be used for inflating air mattresses, rafts and other inflatable or pneumatic devices that do not have standard valve stems to receive an air chuck or are not designed to receive a needle assembly.

Referring again to FIGS. 5 and 6, the body 55 of the apparatus 54 possesses a gauge 56 for measuring the gas in the ball or other similar pneumatic device. As shown here, the gauge 56 is of a mechanical type with an analog type rotating dial 58. However, the gauge 56 can also be digital, electrical or any other type known to those skilled in the art. The gauge 56 is in communication with an interior enclosed passage 60 such that the gauge 56 can measure the pressure of the gas present in the interior enclosed passage 60. The gauge 56 can be removably attached to the apparatus 54 or molded as an integral part of the apparatus 54. However, constructing the apparatus 54 in such a way that the gauge 56 is removably attached to the apparatus 54 allows the gauge 56 to be replaced in the event the gauge 56 malfunctions.

The apparatus 54 possesses a connector 62 that serves as a means for attaching the apparatus 62 to a pressurizing source such as an air compressor, a pump, or other similar device (not explicitly shown). As shown, in the illustrative embodiment, the connector 62 is a nipple type connector that can be connected to the pressurizing source by means of a "quick-connect" sliding collar type coupler. However, the connector 62 can also be a threaded screw as well as a sliding collar type coupler, or any other type of suitable coupling, depending on whether the compressor possesses a threaded screw end of a sliding collar type coupler. In addition, the connector 62 can also be any type of coupler which can be selected by those skilled in the art.

A valve assembly 64 is positioned at some point along the apparatus 54 that can be manipulated to interrupt the flow of pressurized gas through the enclosed passage 60. The valve assembly comprises a handle 66 connected to a gate (not explicitly shown) or other means for interrupting or channeling the flow of gas through the enclosed passage 60. The gate (not explicitly shown) or other means for interrupting or channeling the flow of gas through the enclosed passage 60 is controlled by the handle 66. The handle 66 has two positions, OFF (represented at 68) and ON (represented at 70). When the handle 66 is rotate to the OFF position, the gate (not shown) is located so as to interrupt the flow of gas through the enclosed passage 60. When the handle 66 is rotated to the ON position, the gate (not explicitly shown) is located so as to allow gas to flow from the source of the compressed gas to the ball or other pneumatic device.

The apparatus 54 also possesses a button 72, in communication with the enclosed passage 60 through an opening in the body 55. The button 72 is biased with a spring (not explicitly shown) or other biasing mechanism such that when the button 72 is in its neutral position, a surface of the button 72 presses against a surface of the enclosed passage 60 such as to create an airtight seal in the opening in the body 55. Gas can be released from the pneumatic device by pressing the button 72 to break the seal between the button 72 and the surface of the enclosed passage 60. Finally, the apparatus 54 possesses a pressure reducing valve, indicated at 74. This pressure reducing valve prevents the gas coming through the apparatus from exceeding a pre-set level so as to reduce the risk of bursting the pneumatic device.

It will be understood that a suitable pressurizing source can be of any of those mentioned herein or those known to those skilled in the art and well-suited for inflation of sports balls. It will be appreciated that the illustrative embodiment of the present invention arranged specifically for inflation of sports balls can include more, or fewer, components and features than those shown in FIGS. 1 & 2, as well as being more compact. Moreover, the gauge used for measuring pressure of the gas in the sports ball can be any of those known in the art with a pressure range and accuracy suitable for inflation of sports balls.

From the forgoing, it will be appreciated that the illustrative embodiments described herein provide an apparatus for conveniently introducing air or other pressurized gas into a tire, sports ball or other pneumatic device which also allows the user to check the pressure of the gas and to allow the user to release excess air or other gas from the tire or other pneumatic device without removing the apparatus from the tire or other pneumatic device.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus providing an enclosed passage suitably sized and shaped to conduct a pressurized gas, from a pressurizing source, and introducing it into a pneumatic device, said apparatus comprising:

means for attaching the apparatus to the pressurizing source;

means for removably attaching the apparatus to the pneumatic device, for the purpose of introducing the pressurized gas into the pneumatic device, the means being attached to the enclosed passage and being positioned with respect to the enclosed passage such that the means for removably attaching the apparatus to the pneumatic device can be removably attached to the pneumatic device when the apparatus is attached to the pressurizing source, to effect the delivery of the pressurized gas into the pneumatic device;

means for measuring the gas pressure contained in the pneumatic device, the means for measuring gas pressure being located with respect to the enclosed passage so as to be in sufficient communication with the enclosed passage as to substantially measure the pressure of the gas within the pneumatic device;

a valve positioned at a point along the enclosed passage that can be manipulated to interrupt the flow of pressurized gas through the enclosed passage; and the apparatus being arranged such that when the valve is manipulated to interrupt the flow of pressurized gas through the enclosed passage, the pressure of the gas inside the enclosed passage is substantially measured by the gauge, and being further arranged such that when the apparatus is connected to the pneumatic device, but disconnected from the pressurizing source, the valve can be manipulated to allow gas to be released from the pneumatic device through the apparatus.

2. The apparatus of claim 1 wherein the means for removably attaching the apparatus to the pneumatic device comprises a chuck for attaching to a valve stem of the pneumatic device and wherein the chuck is rotatable with respect to the pressure gauge.

3. The apparatus of claim 1, wherein the means for attaching the apparatus to the pressurizing source comprises means for removably attaching the apparatus to the pressurizing source.

4. The apparatus of claim 1 wherein the pneumatic device is selected from the group comprising: a vehicle tire, a bicycle tire and a sports ball.

5. The apparatus of claim 1 wherein the means for removably attaching the apparatus to the pneumatic device comprises an inflation needle.

6. The apparatus of claim 1 wherein the means for measuring the gas pressure contained in the pneumatic device is selected from the group consisting of one of the following: a gauge having a measurement range from 0 to 120 psi, a gauge having a measurement range from 0 to 60 psi and a gauge having a measurement range from 0 to 20 psi.

7. The apparatus of claim 1 further comprising a means to reduce the pressure from the pressurizing source.

8. An apparatus providing an enclosed passage suitably sized and shaped to conduct a pressurized gas, from a pressurizing source, and introducing it into a pneumatic device, said apparatus comprising:

means for attaching the apparatus to the pressurizing source;

means for removably attaching the apparatus to the pneumatic device, for the purpose of introducing the pressurized gas into the pneumatic device, the means being attached to the enclosed passage and being positioned with respect to the enclosed passage such that the means for removably attaching the apparatus to the pneumatic device can be removably attached to the pneumatic device when the apparatus is attached to the pressurizing source, to effect the delivery of the pressurized gas into the pneumatic device;

means for measuring the gas pressure contained in the pneumatic device, the means for measuring gas pressure being located with respect to the enclosed passage so as to be in sufficient communication with the enclosed passage as to substantially measure the pressure of the gas within the pneumatic device;

at least one valve positioned at a point along the enclosed passage that can be manipulated to interrupt the flow of pressurized gas through the enclosed passage; and the apparatus being arranged such when the at least one valve is be manipulated to interrupt the flow of pressurized gas through the enclosed passage, the pressure of the gas inside the enclosed passage is substantially measured by the gauge, and being further arranged such that the at least one valve can be manipulated to allow gas to be released from the pneumatic device.

9. The apparatus of claim 8 wherein the at least one valve is capable of assuming a first control position, a second control position and a third control position and a bleed port, such that when in the third control position a valve gate interrupts the flow of gas from the source of compressed gas and directs gas from the pneumatic device to exit through the bleed port causing the pneumatic device to be deflated.

10. The apparatus of claim 8 wherein the at least one valve comprises a plurality of valves such that a first valve is capable of assuming a first control position and a second control position such that in the first control position, a valve gate interrupts the flow of gas from the source of compressed gas and in the second control position the valve gate allows the flow of gas from the source of compressed into the pneumatic device and a second valve is capable of being manipulated to as to release gas from the pneumatic device.

11. The apparatus of claim 10 wherein at least one valve comprises a push button.

12. The apparatus of claim 8 wherein the means for removably attaching the apparatus to the pneumatic device comprises a chuck for attaching to a valve stem of the pneumatic device and wherein the chuck is rotatable with respect to the pressure gauge.

13. The apparatus of claim 8, wherein the means for attaching the apparatus to the pressurizing source comprises means for removably attaching the apparatus to the pressurizing source.

14. The apparatus of claim 8 wherein the pneumatic device is selected from the group comprising: a vehicle tire, a bicycle tire and a sports ball.

15. The apparatus of claim 8 wherein the means for removably attaching the apparatus to the pneumatic device comprises an inflation needle.

16. The apparatus of claim 8 wherein the means for measuring the gas pressure contained in the pneumatic device is selected from the group consisting of one of the following: a gauge having a measurement range from 0 to 120 psi, a gauge having a measurement range from 0 to 60 psi and a gauge having a measurement range from 0 to 20 psi.

17. The apparatus of claim 15 wherein the dimensions of the apparatus are selected from the group consisting of one of the following: having length of less than 20 centimeters and greater than 12 centimeters and having a width of less than 6 centimeters and greater than 3 centimeters; having a length less than 12 centimeters and greater than 6 centimeters and having a width of less than 4 centimeters and greater than 2 centimeters; and having a length of less than 6 centimeters and greater than 2 centimeters and having a width of less than 3 centimeters and greater than 1 centimeter.

18. An apparatus providing an enclosed passage suitably sized and shaped to conduct a pressurized gas, from a pressurizing source, and introducing it into a pneumatic device, said apparatus comprising:

means for attaching the apparatus to the pressurizing source;

means for removably attaching the apparatus to the pneumatic device, for the purpose of introducing the pressurized gas into the pneumatic device, the means being attached to the enclosed passage and being positioned with respect to the enclosed passage such that the means for removably attaching the apparatus to the pneumatic device can be removably attached to the pneumatic device when the apparatus is attached to the pressurizing source, to effect the delivery of the pressurized gas into the pneumatic device;

means for measuring the gas pressure contained in the pneumatic device, the means for measuring gas pressure being located with respect to the enclosed passage so as to be in sufficient communication with the enclosed passage as to substantially measure the pressure of the gas within the pneumatic device;

at least one valve positioned at a point along the enclosed passage that can be manipulated to interrupt the flow of pressurized gas through the enclosed passage;

the apparatus being arranged such that the at least one valve is capable of assuming a first control position, a second control position and a third control position and a bleed port, such that when in the third control position a valve gate interrupts the flow of gas from the source of compressed gas and directs gas from the pneumatic device to exit through the bleed port causing the pneumatic device to be deflated;

wherein the means for removably attaching the apparatus to the pneumatic device comprises a chuck for attaching to a valve stem of the pneumatic device and wherein the chuck is rotatable with respect to the pressure gauge;

wherein the means for attaching the apparatus to the pressurizing source comprises means for removably attaching the apparatus to the pressurizing source; and wherein the pneumatic device is selected from the group comprising: a vehicle tire, a bicycle tire and a sports ball.

19. An apparatus providing an enclosed passage suitably sized and shaped to conduct a pressurized gas, from a pressurizing source, and introducing it into a pneumatic device, the apparatus comprising:

means for attaching the apparatus to the pressurizing source;

means for removably attaching the apparatus to the pneumatic device, for the purpose of introducing the pressurized gas into the pneumatic device, the means being attached to the enclosed passage and being positioned with respect to the enclosed passage such that the means for removably attaching the apparatus to the pneumatic device can be removably attached to the pneumatic device when the apparatus is attached to the pressurizing source, to effect the delivery of the pressurized gas into the pneumatic device;

means for measuring the gas pressure contained in the pneumatic device, the means for measuring gas pressure being located with respect to the enclosed passage so as to be in sufficient communication with the enclosed passage as to substantially measure the pressure of the gas within the pneumatic device;

at least one valve positioned at a point along the enclosed passage that can be manipulated to interrupt the flow of pressurized gas through the enclosed passage;

the apparatus being arranged such that the at least one valve is capable of assuming a first control position, a second control position and a third control position and a bleed port, such that when in the third control position a valve gate interrupts the flow of gas from the source of compressed gas and directs gas from the pneumatic device to exit through the bleed port causing the pneumatic device to be deflated;

wherein the means for removably attaching the apparatus to the pneumatic device comprises an inflation needle;

wherein the means for attaching the apparatus to the pressurizing source comprises means for removably attaching the apparatus to the pressurizing source; and wherein the pneumatic device is selected from the group comprising: a vehicle tire, a bicycle tire and a sports ball.

20. The apparatus of claim 19 further comprising a means to reduce the pressure from the pressurizing source.

* * * * *